United States Patent [19]

Nakajima et al.

[11] 4,088,573
[45] May 9, 1978

[54] METHOD FOR CLARIFYING AQUEOUS WASTE LIQUIDS CONTAINING ACID DYES

[75] Inventors: Mikio Nakajima, Fujisawa; Kiyoaki Kuwabara, Yokohama, both of Japan

[73] Assignee: Nippon Carbide Kogyo Kabushiki Kaisha, Tokyo, Japan

[21] Appl. No.: 742,066

[22] Filed: Nov. 15, 1976

Related U.S. Application Data

[63] Continuation of Ser. No. 565,462, Apr. 7, 1975, abandoned.

[30] Foreign Application Priority Data

Apr. 8, 1974 Japan .................................. 49-38775

[51] Int. Cl.² ............................................... C02B 1/20
[52] U.S. Cl. .......................................... 210/53; 210/54
[58] Field of Search ............................. 210/28, 52–54

[56] References Cited

U.S. PATENT DOCUMENTS

| | | | |
|---|---|---|---|
| 3,066,095 | 11/1962 | Hronas | 210/53 |
| 3,285,849 | 11/1966 | Watanabe et al. | 210/53 |
| 3,290,310 | 12/1966 | Morf et al. | 210/54 |
| 3,484,837 | 12/1969 | Odom et al. | 210/52 |

FOREIGN PATENT DOCUMENTS

| | | | |
|---|---|---|---|
| 2,189,327 | 1/1974 | France. | |
| 1,080,383 | 8/1967 | United Kingdom | 210/54 |

*Primary Examiner*—Charles N. Hart
*Assistant Examiner*—Ivars Cintins
*Attorney, Agent, or Firm*—Sherman & Shalloway

[57] ABSTRACT

A method for clarifying an aqueous waste liquid containing acid dyes dissolved therein by bringing said waste liquid into contact with a dicyandiamide-formaldehyde resin, wherein said dicyandiamide-formaldehyde in an optimum amount as defined in the specification and at least about 300 ppm of aluminum sulfate are added sequentially to said aqueous waste liquid, the amount of the additives being based on 100 ppm of the dyes.

3 Claims, 2 Drawing Figures

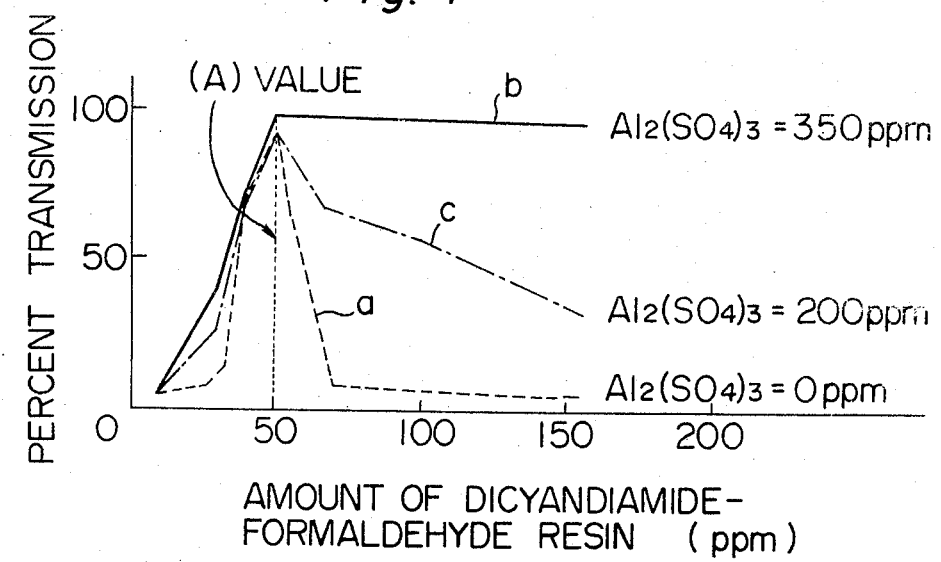
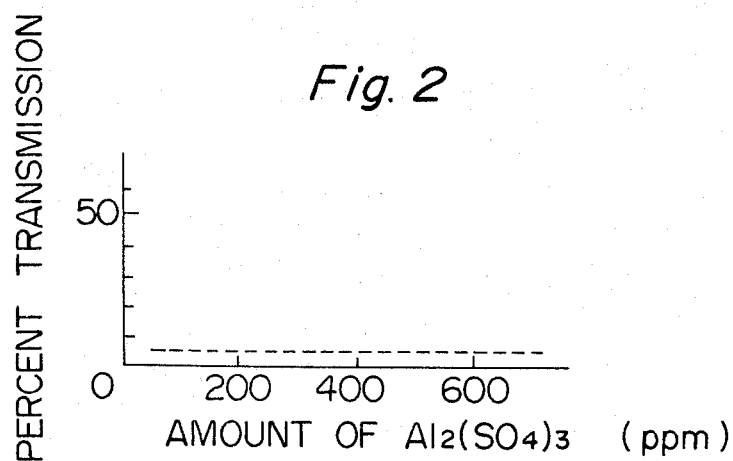

METHOD FOR CLARIFYING AQUEOUS WASTE LIQUIDS CONTAINING ACID DYES

This is a continuation of application Ser. No. 565,462, filed Apr. 7, 1975, now abandoned.

This invention relates to a method for clarifying aqueous waste liquids containing dyes, especially acid dyes, dissolved therein at low cost and by an easy operation.

More specifically, this invention relates to a method for clarifying an aqueous waste liquid containing acid dyes dissolved therein by bringing said waste liquid into contact with a dicyandiamide-formaldehyde resin, wherein said dicyandiamide-formaldehyde in an optimum amount as measured by the method to be described hereinbelow, and at least about 300 ppm of aluminum sulfate are added sequentially to said aqueous waste liquid, the amounts of the additives being based on 100 ppm of the dyes.

Aqueous waste liquids discharged from industrial establishments involving the production and use of dyes contain dye compounds in the dissolved state and are colored to a significant degree. Throwing away of these wastes directly into rivers, lakes and seas is prohibited under regulations for controlling environmental pollution, and clarification of these wastes has been an important problem.

In order to solve this problem various attempts have been made to clarify dye-containing waste liquids, and those in current practice are based mainly on the use of organic polymeric flocculating agents. However, depending upon the type of the dyes contained in the waste liquids, the results obtainable are unsatisfactory. In particular, the addition of an organic polymeric flocculating agent, such as most commonly used polyacrylamide flocculating agents to waste liquids containing acid dyes cannot bring about a satisfactory clarifying effect.

It has been known on the other hand that dicyandiamide-formaldehyde resins can be used to treat industrial waste waters containing water-insoluble suspended matters or hydrophilic colloidal substances (Japanese patent publication No. 23231/1961 published on Nov. 30, 1961). This Japanese Patent Publication discloses that these resins are suitable for removing water-insoluble solid suspended matters such as pulp refuse or colloidal substances contained, for example, in spent liquors from paper mills. However, this patent fails to give any specific description as to whether such resins can be used for treating aqueous waste liquids containing acid dyes which are dissolved therein to form a true solution.

After about 10 years from the above proposal, French Pat. No. 2,189,327 (corresponding to Japanese laid-open patent publication No. 57662/74) disclosed a method for clarifying a waste water containing water-soluble anionic dyes or optical bleaching agents by adding a wide variety of water-soluble formaldehyde condensation products which embrace the known dicyandiamide-formaldehyde resins disclosed in the Japanese patent publication No. 23231/61. This proposal states that dicyandiamide, or a condensation product formed between dicyandiamide and formaldehyde, or modified products of these can be used, and urea or alkylene polyamine-modified condensation products are suitable. It also states that in some cases, the conjoint use of iron salts and these condensates is advantageous. However, it fails to disclose anything about aluminum salts which embrace the aluminum sulfate. Furthermore, none of the examples in this patent show the conjoint use of the iron salts and the dicyandiamide-formaldehyde resin.

We made investigations about methods for clarifying waste liquids containing acid dyes dissolved therein by contacting the aqueous waste liquids with the dicyandiamide-formaldehyde resin to precipitate and flocculate the acid dyes. This work led to the conclusion that with this resin, it is very difficult operationally to obtain an optimum clarifying effect, and the use of this resin is unsuitable for commercial operations.

We furthered our work to determine the cause of such a deficiency, and found that the dicyandiamide-formaldehyde resin in the above clarification treatment brings about a good result when used in an optimum amount within a fairly critical narrow range, and if the amount is too large or small beyond this range, the effect of precipitating and flocculating acid dyes dissolved in the aqueous waste liquids is markedly reduced. It was also ascertained that this optimum amount varies according to even a relatively slight change in the concentration of the dye in the waste solution, and it is extremely difficult in actual operations to follow up this change and control the concentration of the dye which frequently changes during the treatment. In addition to this difficulty, the treatment is not simple and costs are high. This new technical problem has yet to be solved in order to render this method feasible on an industrial scale.

Our further work to solve this new problem unexpectedly showed that when aluminum sulfate, which does not give any appreciable precipitating and flocculating effect when added alone to an aqueous solution containing acid dyes, is used together with the above dicyandiamide-formaldehyde resin, and they are added to the aqueous waste liquid sequentially without adding them simultaneously, the range of optimum amounts of the dicyandiamide-formaldehyde resin can be greatly broadened without any substantial reduction in its precipitating and flocculating effect at higher concentrations of the dye. Accordingly, aqueous waste liquids containing acid dyes dissolved therein can now be clarified effectively by a very easy operation and at low cost. It was also found that this unexpected result cannot be obtained by using iron salts such as ferric chloride.

It is an object of this invention therefore to provide a satisfactory method for clarifying aqueous waste liquids containing acid dyes dissolved therein.

Other objects and advantages of this invention will become more apparent from the following description.

The dicyandiamide-formaldehyde resin used in the method of this invention is a water-soluble resin, and can be prepared, for example, by dissolving about 1 mol of dicyandiamide in about 1 mol of hydrochloric acid, reacting them gradually, adding about 2 mols of formaldehyde, and while maintaining the reaction temperature at about 90° to 100° C., performing the reaction with stirring for a suitable period of time, for example, for about 5 hours. Usually, resins having a viscosity (resin concentration 50% by weight, room temperature) of about 30 to about 500 centipoises, preferably about 30 to about 300 centipoises, can be used preferably.

According to the method of this invention, the optimum amount of the dicyandiamide-formaldehyde resin and at least about 300 ppm, preferably at least about 350 ppm, of aluminum sulfate, both based on 100 ppm of the dye in the waste liquid, are added sequentially. There is no limitation in the order of adding them, but either of them can be added first. For example, the above resin is added to the waste liquid whose pH has been adjusted to a desired value, preferably an acidic region of not more than 7, in the course of conducting the waste liquid to a sedimentation apparatus or filtration apparatus, and the mixture is stirred so as not to cause nonuniformity in concentration. This results in the formation of a flocculated matter. Then, aluminum sulfate is added, and the mixture is stirred somewhat slowly. The flocculated dye can be sedimented or collected by filtration. Conversely, aluminum sulfate can be added first, and then, the above resin.

The amount of the dicyandiamide-formaldehyde resin used in the method of this invention is the optimum amount which can be determined in advance by the following method for various water-soluble acid dyes.

METHOD FOR DETERMINING THE OPTIMUM AMOUNT

A sample aqueous dye solution having a dye concentration of 100 ppm is prepared. 300 ml. of this sample aqueous dye solution is placed in each of seven 500 ml. beakers. The pH of the sample aqueous dye solution is adjusted to 8, 7, 6, 5, 4, 3, and 2 respectively using hydrochloric acid or sodium hydroxide. An aqueous solution of the dicyandiamide-formaldehyde is added to the sample aqueous dye solution so that the concentration of the resin in the aqueous solution becomes 100 ppm. Using a jar tester (a product of Miyamoto Seisakusho, Japan), the sample aqueous solution is stirred for 5 minutes at a speed of 150 rpm, and for another 5 minutes at 50 rpm. It is then allowed to stand for 30 minutes, and filtered using a filter paper No. 5c (JIS P 3801; a product of Toyo Filter Paper Co., Ltd.). The percent transmission of the filtrate is measured. The measurement of the percent transmission is performed using light of a maximum absorption wavelength in the absorption curve of the acid dye used. The maximum pH value of the sample which shows the maximum percent transmission is made an optimum pH value.

Then, aqueous dye solutions with a dye concentration of 100 ppm are prepared in the same way as above except that the pH value is all adjusted to the above optimum pH. Then, an aqueous solution of the dicyandiamide-formaldehyde resin is added in varying concentrations to these sample aqueous solutions. The percent transmission of each of the filtrates is measured in the same way as above using the same jar tester. The amount (A, in ppm) of the resin of the sample which shows the maximum percent transmission is determined, and the optimum amount (ppm) is calculated from the following equation:

$$(A) \pm [(A) \times 0.1].$$

For example, three or four samples having resin concentrations differing from each other by 2 to 200 ppm are tested, and five to 10 samples each having concentrations differing from each other by very narrow ranges below and above the resin concentration of the sample which shows the maximum percent transmission are again tested. In this way, the optimum amount (A) can be easily determined.

By determining the optimum amount for each of various acid dyes, the amount of the dicyandiamide-formaldehyde resin to be added to the aqueous waste liquid containing acid dyes dissolved therein can be determined. If the aqueous waste liquid contains two or more acid dyes, the precipitating and flocculating treatment may be carried out more than two times using the optimum amount for each of the dyes. Usually, however, it is sufficient to add the resin on the basis of that dye which shows the maximum (A) values among the acid dyes contained in it. This is because, as will be illustrated by the accompanying drawings, the addition of aluminum sulfate results in the broadening of the optimum range of the amount of the resin, which is usually narrow, to a higher concentration side.

Usually, the amount of the dicyandiamide-formaldehyde is generally about 2 to about 500 ppm, preferably about 2 to 200 ppm, more preferably about 10 to 150, especially about 20 to 150 ppm, per 100 ppm of the dye.

The amount of aluminum sulfate should be at least about 300 ppm, preferably at least about 350 ppm, per 100 ppm of the dye in the waste liquid. There is no particular restriction on the upper limit of the amount, but in view of economy, amounts of less than 1000 ppm would be sufficient. If the amount is less than about 300 ppm, the effect of broadening the optimum range of the dicyandiamide-formaldehyde is reduced.

The broadening of the optimum range of the amount of the resin by the conjoint use of the resin and aluminum sulfate is described below by reference to the accompanying drawings, taking up Suminol Milling Brilliant Red B (an acid dye, C.I. Acid Red 249, a product of Sumitomo Chemical Co., Ltd., Japan) as an example.

FIG. 1 is a graphic representation which shows the relation between the optimum amount of the dicyandiamide-formaldehyde and the percent transmission of an aqueous dye solution containing the acid dye in a concentration of 100 ppm, which are determined by the above-mentioned method (the dotted line $a$), and the relation between them which varies by the addition of aluminum sulfate (the solid line $b$ and the line $c$). FIG. 2 is a graphic representation showing the variation in percent transmission when only aluminum sulfate is added in varying amounts to the above aqueous dye solution.

As is shown in FIG. 2, there is no appereciable change even when aluminum sulfate is added to the above aqueous dye solution in a concentration of about 700 ppm. This means that the aluminum sulfate does not exhibit a precipitating and flocculating effect on acid dyes dissolved in the aqueous dye solution. On the other hand, it is seen from FIG. 1 that when the dicyandiamide-formaldehyde resin is added alone in varying concentrations to the aqueous dye solution, there is a peak of the precipitating and flocculating effect ([(A) value] of the acid dye at about 50 ppm as shown by line $a$, but that when the concentration is lower or higher than it, the percent transmission decreases remarkably, and the effect of precipitating and flocculating the acid dye becomes very poor. In contrast, when 200 ppm of aluminum sulfate is added, the precipitating and flocculating effect is not reduced so much as in the line $a$ even when the dicyandiamide-formaldehyde resin is added in a concentration higher than the concentration which shows the (A) value. Furthermore, when aluminum sulfate is added in a concentration of 350 ppm which is the preferred lower limit of the amount of the resin in the present invention, the critical range of the effective amount of the dicyandiamide-formaldehyde resin is broadened to the higher concentration side. This is quite an unexpected result in view of the results obtained by adding aluminum sulfate alone as shown in FIG. 2.

The waste liquids to be treated by the method of this invention are aqueous waste liquids in which acid dyes are present in the dissolved state. These waste liquids may, or may not, be pre-treated to remove other substances than the acid dyes prior to the treatment in accordance with this invention. Some examples of acid dyes and their (A) values are tabulated below. Where there is a symbol "-" in the extreme left column, the (A) value has not been measured.

| Dyes (trademarks) | Color Index | Approximate (A) value (ppm) |
|---|---|---|
| Amaranth | Acid Red 27 | 100 |
| Kayacyl Blue HRL | Acid Blue 182 | 80 |
| Kayacyl Yellow GG | Acid Yellow 17 | 130 |
| Kayacyl Rubinol 3GS | Acid Red 37 | 100 |
| Kayacyl Violet 3R | Acid Violet 42 | — |
| Suminol Milling Red 3B | Acid Red 89 | — |
| Suminol Milling Orange GN | Acid Orange 95 | 80 |
| Suminol Milling Orange R | Acid Orange 45 | — |
| Suminol Milling Yellow 3G | Acid Yellow 72 | 50 |
| Suminol Milling Brilliant Red B | Acid Red 249 | 50 |
| Suminol Milling Brilliant Blue G | Acid Blue 127 | 90 |
| Cibalan Blue BL | Acid Blue 168 | 3 |
| Cibalan Brilliant Blue GL | Acid Blue 183 | 80 |
| Cibalan Brilliant Red BL | Acid Red 252 | 80 |
| Cibalan Brilliant Yellow 3GL | Acid Yellow 127 | 60 |
| Cibalan Brown BL | Acid Brown 19 | 30 |
| Cibalan Orange RL | Acid Orange 88 | 30 |
| Polycor Black CL | Acid Black 126 | — |
| Polycor Blue B | Acid Blue 120 | 40 |
| Polycor Dark Blue B | Acid Black 24 | 50 |
| Polycor Yellow G | Acid Yellow 67 | — |
| Neolan Yellow | Acid Yellow 99 | 100 |
| Suminol Leverling Red 3B | Acid Red 257 | 30 |

According to this invention, even when excessive dicyandiamide-formaldehyde resin is added to the dye solution, the waste liquid can be clarified without a reduction in clarifying effect. This means that the clarifying effect is ensured even if the concentration of the acid dye solution to be discharged is reduced as compared with the predetermined amount of the dicyandiamine-formaldehyde resin fed.

The following Examples and Comparative Examples illustrate the present invention more specifically.

EXAMPLE 1

A jar test was performed using a solution of a dye (Suminol Milling Brilliant Red B, C.I. Acid Red 249) in a concentration of 100 ppm. The results are shown in Table 1.

The amount of aluminum sulfate to be used together with the dicyandiamide-formaldehyde resin was changed to 350 ppm and 700 ppm, but in either case, there was no reduction in flocculating effect even when the optimum amount of the dicyandiamide-formaldehyde resin was from about 50 to 150 ppm.

COMPARATIVE EXAMPLE 1

The procedure of Example 1 was repeated except that the amount of aluminum sulfate to be used together with the dicyandiamide-formaldehyde resin was less than 300 ppm. The results are shown in Table 1.

It is clear from these results that no flocculating effect can be obtained when the amount of the dicyandiamide-formaldehyde resin is above the optimum amount.

COMPARATIVE EXAMPLE 2

The procedure of Example 1 was repeated except that only the aluminum sulfate was used without using the dicyandiamide-formaldehyde resin. The results are shown in Table 1 from which it is clear that there was hardly any flocculating effect.

EXAMPLE 2

A jar test was performed using a solution of a dye (Kayacyl Blue HRL) in a concentration of 100 ppm. The results are shown in Table 1.

These results demonstrate that even when the concentration of the dye is decreased to about a half of the concentration of the dicyandiamide-formaldehyde resin, the flocculating effect is not reduced.

COMPARATIVE EXAMPLE 3

The procedure of Example 2 was repeated except that only the dicyandiamide-formaldehyde resin was used. It was found that the flocculating effect was markedly reduced when the amount of the resin was above the dye concentration.

Table 1

Coagulating effect (percent transmission)

| | Example 1 | | Comparative Example 1 | | | Comparative Example 2 | | | Example 2 | Comparative Example 3 |
|---|---|---|---|---|---|---|---|---|---|---|
| Resin (ppm) | Amount of aluminum sulfate (ppm) | | Amount of aluminum sulfate (ppm) | | | Aluminum sulfate (ppm) | Percent transmission | Resin (ppm) | Amount of aluminum sulfate (400 ppm) | No aluminum sulfate |
| | 350 | 700 | 200 | 100 | 0 | | | | | |
| 10.0 | 5.4 | 5.6 | 5.4 | 5.0 | 5.0 | 10 | less than 5 | 1 | 6.0 | 6.0 |
| 29.6 | 40.3 | 41.1 | 26.0 | 39.8 | 8.1 | 50 | " | 5 | 6.2 | 6.5 |
| 39.2 | 75.6 | 79.2 | 74.6 | 78.1 | 81.6 | 100 | " | 50 | 35.2 | 32.0 |
| 48.8 | 99.3 | 99.5 | 94.4 | 93.7 | 94.3 | 150 | " | 80 | 92.5 | 90.1 |
| 53.3 | 97.7 | 99.1 | 81.7 | 82.4 | 62.4 | 200 | " | 90 | 92.0 | 82.0 |
| 67.6 | 96.9 | 98.4 | 64.2 | 64.2 | 5.1 | 300 | " | 100 | 91.3 | 58.0 |
| 95.2 | 96.8 | 99.0 | 61.1 | 13.0 | 5.0 | 400 | " | 150 | 92.1 | 22.5 |
| 139.2 | 96.0 | 98.7 | 40.9 | 5.9 | 4.6 | 500 | " | 200 | 91.0 | 12.0 |
| 152.3 | 96.0 | 98.1 | 32 | 5.1 | — | 700 | " | 300 | 91.8 | 11.0 |

Acid dye: Suminol Milling Brilliant Red B 100 ppm, pH 5
Measuring wavelength: λ=520 nm Acid dye: Kayacyl Blue HRL, 100 ppm, pH 4.0
Measuring wavelength λ=590 nm

What we claim is:
1. A method for clarifying an aqueous waste liquid containing at least one acid dye dissolved therein, said method comprising sequentially bringing said waste liquid into contact with (a) a water-soluble dicyandiamide-formaldehyde resin and (b) at least 300 ppm of aluminum sulfate in the order of (a) followed by (b); the amount of said resin (a) being at least the optimum amount which is expressed by the formula $$(A) \pm [(A) \times 0.1]$$

wherein (A) stands for an amount (ppm) of the dicyandiamide-formaldehyde resin measured by use of a jar tester which shows a maximum percent transmission measured by a light of a maximum absorption wavelength in the absorption curve of said acid dye; wherein the amount of resin (a) and aluminum sulfate (b) are each based on 100 ppm of the acid dye dissolved in said aqueous waste liquid.

2. The method of claim 1 wherein said dicyandiamide-formaldehyde resin (a) has a viscosity, as measured at room temperature, with respect to its 50% by weight aqueous solution, of about 30 to about 500 centipoises.

3. The method of claim 1 wherein the amount of the aluminum sulfate (b) which is sequentially added to the aqueous waste liquor is in the range of from about 350 ppm to about 1,000 ppm per 100 ppm of the acid dye in the aqueous waste liquid.

* * * * *